United States Patent [19]
Brotz

[11] Patent Number: 5,395,572
[45] Date of Patent: Mar. 7, 1995

[54] PROCESS FOR MAKING CELLULAR SILICON CARBIDE

[76] Inventor: Gregory R. Brotz, P.O. Box 1322, Sheboyan, Wis. 53081

[21] Appl. No.: 127,638

[22] Filed: Sep. 27, 1993

Related U.S. Application Data

[63] Continuation-in-part of Ser. No. 719,395, Jun. 24, 1991, Pat. No. 5,248,462, which is a continuation-in-part of Ser. No. 460,801, Jan. 4, 1990, abandoned.

[51] Int. Cl.⁶ ............................................. B29C 65/00
[52] U.S. Cl. ....................................... 264/43; 264/44; 264/66
[58] Field of Search .................. 264/42, 43, 44, 49, 264/66; 419/2; 423/345; 501/80

[56] References Cited

U.S. PATENT DOCUMENTS

| | | | |
|---|---|---|---|
| 3,824,112 | 7/1974 | Lawrence et al. | 264/43 |
| 3,888,691 | 6/1975 | Vallani et al. | 264/43 |
| 4,017,571 | 4/1977 | Rice et al. | 264/42 |
| 4,117,096 | 9/1978 | Hosaka et al. | 423/345 |
| 4,563,432 | 1/1986 | Ehlert et al. | 264/42 |
| 4,886,652 | 12/1989 | Krishnan et al. | 423/345 |

Primary Examiner—Christopher A. Fiorilla
Attorney, Agent, or Firm—William Nitkin

[57] ABSTRACT

A process for making a structural member wherein bead members are mixed with a selected material and the mixture is compressed and molded into a shape. The compressed mixture is then heated and the bead members removed by melting. The remaining structure, having been thus formed with a plurality of cells therein where the bead members had been removed, can in some embodiments be further heated to a point sufficient to form a strong, lightweight useful structural member, retaining such plurality of cells therein and creating a substantially solid, structural foam member.

4 Claims, 3 Drawing Sheets

PROCESS FOR MAKING CELLULAR SILICON CARBIDE

This application is a continuation-in-part of my previous application for Process for Making Silicon Carbide Foam, Ser. No. 07/719,395, filed Jun. 24, 1991, now U.S. Pat. No. 5,248,462, which is a continuation-in-part of my previous application under the same title, Ser. No. 07/460,801, filed Jan. 4, 1990, now abandoned.

BACKGROUND OF THE INVENTION

1. Field of the Invention
2. Description of the Prior Art

It has been difficult in the prior art to manufacture useful foamed solid products having a plurality of open and/or closed cells therein, especially of hard, high-temperature materials such as carbide compositions or other refractory materials.

SUMMARY OF THE INVENTION

It is an object of this invention to provide a process for the production of solid, foam-like structures having strong cell walls made from carbide composition materials or other refractory material such as corundum, calcined alumina, tabular alumina and metal silicates. Also, it is an object to produce foamed or cellular structures of sintered metals and sintered alloys of metals. It is a further object to produce in cellular form fused silicates of glass and porcelain enamels. Solid foams of carbides, nitrides, borides, sulfides and fluorides can also be made by the process of this invention. Because of the low cost of such ingredients, such a process is highly desirable for use in production of foams from carbide compositions and other refractory materials. Foam structures so produced form strong, lightweight structural beams that can be used for a wide variety of purposes such as in the aerospace industry. Some structural beams produced by the process of this invention have the property of being electrically non-conductive so that they are especially useful in chemical plants. Besides having compressive, tensile and flexural properties, many of the above materials also possess desirable properties such as high density, high melting point, insolubility, hardness, chemical inertness and volume stability. As with the aluminum oxide materials many have good resistance to shock and abrasion. Most are nontoxic and have good colorability. They are good electrical insulators. Some have excellent thermal conductivity and are able to maintain their design function at incandescent temperatures. The process is also useful to practice in places having limited supplies of raw materials, such as in outer space, as the sinterable/fusable material obtained from its natural state can be pressed together using powdered metallurgy techniques. The instant invention can include many embodiments of the method to form such foam structures, but they all incorporate the use of molding beads. One such method is to simply press a plastic clay into the interstices of the molding beads. This method can be accomplished by a number of means. Because of the advances in the area of continuous tunnel kilns over the past few decades, the method of this invention is facilitated by such developments. A continuous extrusion of a stiff paste consisting of any or most of the above mineral categories and water or volatile binder can be laid down over the top of a passing continuous molding belt with the molding beads filling the molds. An upper molding belt can press the paste into the interstices of the beads. This method alleviates any problem of displacing air because the air is free to pass back through the unfilled spaces. As the continuous shaped body leaves the molding belt, it can pass directly into the drying oven and then into the kiln. The shaped body can be cut to lengths, stacked and sent through the other processing stages.

Another means to produce the cellular structure of this invention is by slip casting. Beads that are vaporizable but will absorb water or other fluids can be used advantageously. When slip casting is being used to fill the cavities, these drying/molding beads will take on some of the water or other volatile fluid used to make the slip. The beads are preferably composed of a substance that will not want to give the water back up easily. In the case for water, a bead composition might be a high molecular weight carbohydrate such as in the form of highly compressed starch beads or protein gels. The use of beads composed of material that during the heating stage will vaporize out of the mass in an hydrated state or will carry the absorbed moisture out after becoming melted is advantageous. After the slip within the interstices has dried, a second pressing before firing may improve the final product.

Another step that can be useful in the process of this invention is to fuse the molding beads together before the interstices are filled. This step can be done in several ways. In some cases the interstices do not have to be filled entirely. A coating can be applied to the bead surface by passing coating slips through the bead pack, allowing any excess to drain away. After the coating has dried to a degree, the thus formed body can be fired or can be repressed. This type of processing can create even lighter final products or unusual cell shapes and/or configurations. The resulting beam is much lighter in weight due to its porosity than a product made from the same material fused to form a solid. Also, because the processes of this invention create thick cell walls, the resulting product is strong enough to be useful in many areas, such as construction.

An important area for the making of foam structural members by the process of this invention is powder metallurgy. Within this general classification are three categories. The first category is the use in the process of this invention of low-melting point ductile metals such as iron, silver and copper which can be pressurized, as described below, from 10–50 tons per square inch. The second category relates to the processing of refractory metals which can be pressed together at room temperature with a volatile binder to hold the pre-sintered cake of material together until heated in a protective atmosphere at high temperatures to the desired state of sintering. The processing steps can be accomplished as described but can also incorporate advanced methods. During the drying stage radio frequency, induction, dielectric and freeze drying can be used to aid in the products' production. The third category relates to cemented carbide materials. These materials would include carbides of tungsten, titanium and tantalum which can be blended with cobalt powder in the range of from 3%–25% and sintered together to form foams of a very high degree of hardness and compressive strength. The infusion of castable refractories passed through the interstices can also be used.

The basic process of this invention forms a solid foam material for the production, in one embodiment, of architectural beams, sheets or structural members for the building of various structures. In the process a mold is provided and lead shot, for example, or other bead-like material is entered into such mold. The mold can be selected from a variety of shapes. An example of materials that can be used in the process of this invention is a finely divided mixture of carbon powder, silicon powder, and a binder which can be placed around the lead shot. The powdered mixture fills in the spaces between the lead shot and forms around such lead shot. The mixture in the mold is then compressed. The applied pressure makes the surfaces of the instant invention dense thereby maintaining the strength of the structure with increased porosity without the need to add layers on the outside or the use of other processes to create a dense surface which feature is an improvement over the prior art. Further, by the use of large-diameter, bead-like materials the cell walls of the final product are thicker and stronger than those of the prior art, further contributing to the strength of the resulting foam structure. In the example described, each lead shot or bead-like member is surrounded by the silicon and carbon powder mixture. The molded mixture is then placed in its compressed form into a deleading furnace where it is surrounded by heating coils. The lead, having a much lower melting temperature than the silicon or carbon, is melted out of the spaces where it resides within the compressed mass, leaving a series of open cells. The molten lead can be collected and used to form more lead shot in the traditional manner. The carbon, silicon and binder/flux, such as iron, compressed mass with all its cavities remains in the heating chamber where it is heated further until the silicon and carbon fuse to become a silicon carbide foam. The silicon carbide foam can then be cut at various lengths. In some instances other types of bead-like members can be utilized in place of lead shot, as will be described further below, as well as other materials and bead combinations to yield useful foam structures.

DESCRIPTION OF THE PREFERRED EMBODIMENT(S)

Figure 1:
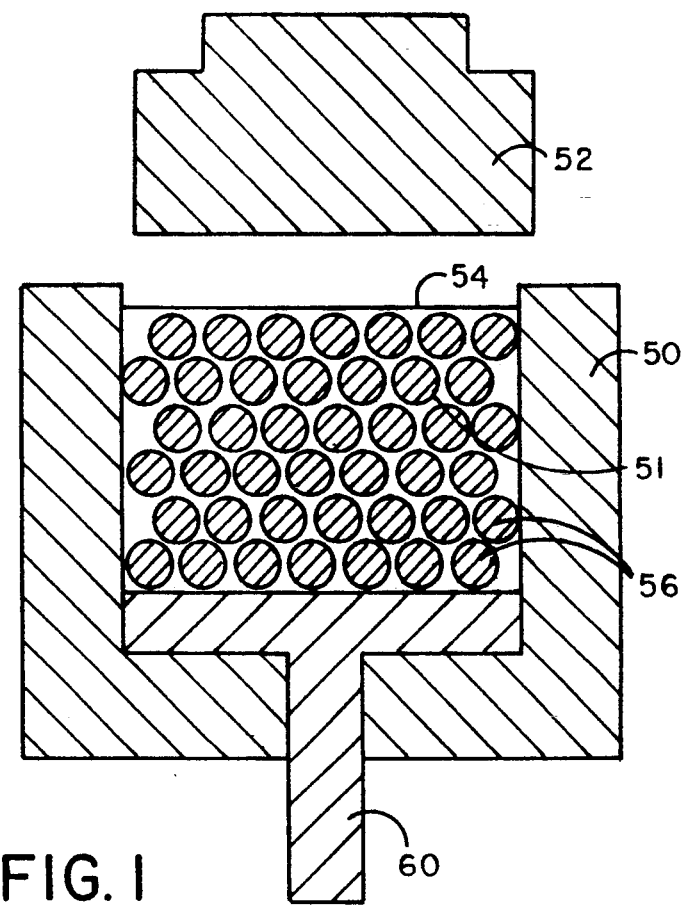
FIG. 1 illustrates a mold used in the process of this invention for producing silicon carbide foam.

The basic process of this invention introduces a plurality of large bead members which can be made of a variety of materials, as discussed below, of a size in the range of 1–10 mm which beads are placed in a mold with a mixture of materials, also described further below. The mixture/beads are compressed in the mold to form a compressed mass which is then removed from the mold and heated sufficiently to melt the bead material, causing the bead material to leave the compressed mass, resulting in the formation of a plurality of apertures in the form of cells having walls where the bead material had been located. The remaining mass is then heated further to form a strong structural member. In one embodiment of the process, the beads can be separated from one another which separation would result in a closed-cellular foam; or the beads can contact one another, which contact would result in an open-cellular foam. The materials from which the foam can be made include a wide variety of carbide compositions and other refractory materials, including ceramics. The material from which the mass is made can not only be two or more powders, but also can be a liquid or paste-like material as described below. Many powder combinations of two or more elements can be utilized, such as silicon plus carbon which carbon can take the form of graphite powder, char, powdered amorphous carbon or channel black. In some cases a flux material, such as boron or iron, can be used to aid in the process of sintering by heat treating so that a bonding of the mixture by fusion occurs. Other mixtures can be used such as curable resins with a powdered catalyst. Such resins can include, but are not limited to, powdered epoxy, powdered phenolic resin, and 30/70–70/30 by weight ratio of a novelac and a resole phenolformaldehyde resin that is first roll milled to a gel state but yet still flowable under high pressure. Also, two or more component liquid resins that harden upon mixing can be utilized. Combinations of various powders, liquids and pastes can also be utilized. Some of the combinations of materials can solidify by their reaction with the composition of the bead material. Also combinations can be utilized where the chemical reaction is not "neat," and there is a byproduct which escapes from the foam during processing. In the cases where the beads are not touching before the mass is pressed which instance can yield the strongest strucures, the outgassing takes the path of small holes which form in the outgassing stage. Once formed, the gasses continue to pass through these initial holes, relieving pressure continuously so that stresses from internal pressure do not ruin the structure. This is, of course, if the temperature ramp is of the proper rate. In some cases an unrefined ore can be utilized such that when heated to create the foam structure, such ore goes through the refining process. There are clay deposits which can be fired just as they are mined. These can be processed and fired as is because the deposit contains the fluxes and fillers naturally needed to work the clay. Foams can also be formed by the conversion of a single substance to another form of that substance. An example of such refinement where there is a conversion can be the use of sufficient heat and pressure to convert carbon material into a diamond state. If the proper form of carbon is packed into the bead interstices where the bead material is of the proper compressive strength, such as a corundum, and the mass is compressed to great pressures and heat, a diamond foam can be produced. The corundum can be later removed by a corrosive alkali wash. In some cases there can be a solubility reaction where the molding beads and the interstitial material can be soluble such as a combination of copper material with carbon beads.

The material to be packed around the beads in the mold can be positioned by a variety of processing methods other than the physical packing thereof as described above. If the material is a liquid, paste, molten solid or a combination of flowable material, it can be injected into the interstitial space between the beads. A powder can be vibrated into the interstitial space and compressed. The compression pressure can be, in some cases, a forging pressure. The material can also be cast into the interstitial spaces between the beads.

Once the foam product has been created, there can be several post-treatment processes applied thereto such as annealing, heating in a reactive gas or liquid atmosphere, or dielectrically heating the foam structure in a reactive atmosphere.

An example of one embodiment of the process of this invention uses lead shot which can be 1–10 mm in diameter or other bead-like material as will be described below, which beads or shot can be entered into a mold and mixed with a mixture of finely divided carbon powder, silicon powder and a binder over the shot. Some prior art silicon carbide foams are made with microsphere-size beads but for architectural-strength beams or sheets the larger size beads of the process of this invention must be used. By the use of large beads, denser cell walls are obtained for greater strength. A vibrator can vibrate the shot to be in contact with one another and to mix the finely divided mixture of carbon powder and silicon powder in the interstices between the bead-like material. In one embodiment the carbon powder and silicon powder can also contain a binding material, such as water or other fluid, to help retain the integrity of the combined mass together while it is being processed. The mixture can be vibrated in the mold. The mixture then forms a solidified slurry, after compression, in the interstitial spaces between the beads. The molded mass is then compressed tightly in the mold so that the bead-like material members contact one another. When the bead-like material is removed, as described below, open cells are formed which cells are open from one to the other where the contact of one bead-like member to another was made. The molded structure or molding is then placed in a deleading furnace which has coils around molding at a temperature sufficient to melt the lead shot or bead-like material which material is held in contact with one another in the silicon powder/carbon powder mixture. The shot or bead-like material is then a melted fluid which fluid flows out of the molded structure. The molding, after removal of the shot, has a plurality of cavities forming open cells within the silicon powder/carbon powder/binder molding. This molding is then placed in a heating chamber which has a high-temperature heater producing sufficient temperature to fuse the carbon and silicon in the structure to form a silicon carbide. The resulting silicon carbide structure can be processed further, such as being cut into beams or sheets. In this way a useful silicon carbide foam structural member can be produced.

In another embodiment of the same process foamed polystyrene beads of low carbon residue or other type of low carbon residue plastic beads can be utilized instead of lead shot as the bead-like material. The silicon powder/carbon powder mixture should be a one-to-one molecular ratio of carbon and silicon in a powdered form with a fluid binder forming an initial slurry which can be forced into the interstices between the beads or shot. The binder then solidifies the slurry around the beads or shot after the vibrating and compressing steps. The molding is heated in a deleading furnace, and the binder is further set, firmly holding the structure together. The molding is then fired in the high-temperature heating chamber to form silicon carbide foam. In some cases the binder can contribute to the carbon content and if this is the case, then that amount of residual carbon should be subtracted from the amount of initial carbon powder mixed with the silicon powder in the slurry. An example of such a mixture can be:

1 molar gram weight of carbon powder
  0.8 molar gram weight of silicon powder
  5% of the carbon and silicon by weight of phenolic resin binder The slurry medium can also include ethynol or methanol to help make a pourable mixture as long as there is a balancing of molar gram weights of the carbon and silicon so that neither one will be present in a greater total molecular amount than the other.

FIG. 1 illustrates the mold used in the process for producing a silicon carbide foamed structural member. In this figure, one can see mold 50 with lift member 60 positioned at the bottom thereof adapted, as will be described below, to lift the contents of mold 50 upward and outward therefrom. Pressure plate 52 is adapted to move downward on the top of the contents within mold 50 to compress and compact the contents under great force. In mold 50 one can see the silicon powder-carbon powder mixture 54 which in certain instances will not need a binder when used in this process because the pressure from compacting the mixture is sufficient to hold the particles together in a compressed mass. Beads 56 are seen with the silicon powder-carbon powder mixture therebetween, such as in area 51, so that the beads are separated from contact with one another.

Figure 2:
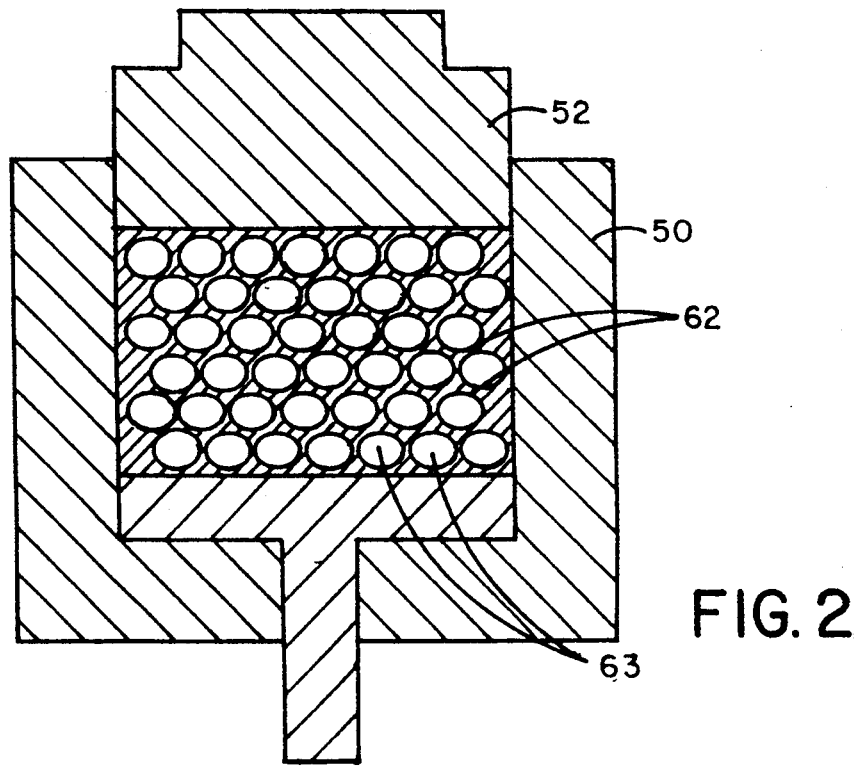
FIG. 2 illustrates the mold of FIG. 1 with the pressure plate compressing the mold's contents.

FIG. 2 illustrates the mold of FIG. 1 where pressure plate 52 has moved down upon the top of the silicon powder/carbon powder/bead mixture, compressing the mass together where the beads as denoted by numeral 63 are deformed from the compression of top 52 compressing the mass. Located between each bead in areas 62 is the silicon powder/carbon powder mixture.

Figure 3:
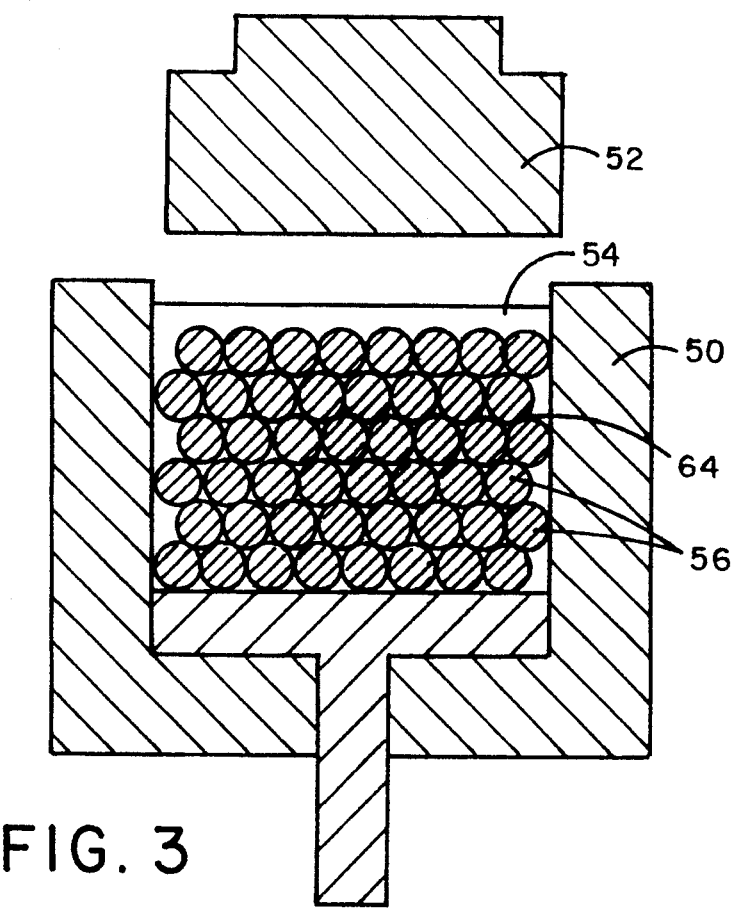
FIG. 3 illustrates a mold containing bead-like members which are in contact with one another.
Figure 4:
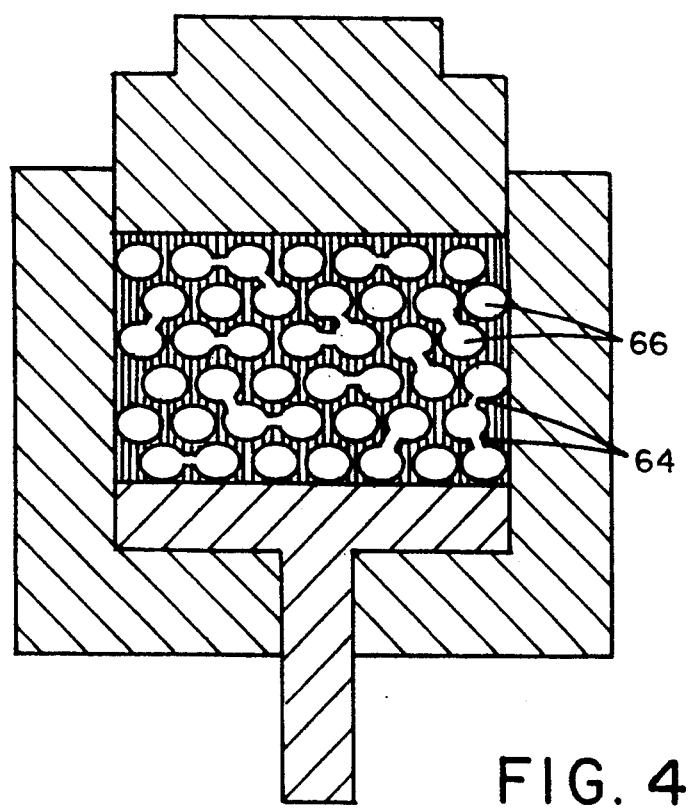
FIG. 4 illustrates the mold of FIG. 3 under pressure from the top member.

FIG. 3 illustrates an alternate process from that illustrated in FIG. 1 with the same type of mold but with beads 56 being in contact with one another within the silicon powder/carbon powder mixture 54. As can be seen at point 64 in FIG. 3, the beads contact one another and as such, when compression occurs as seen in FIG. 4, the beads being in contact with one another have contacting areas 64 between the various beads 66. When sufficient force is applied as seen in this view, the bead material in one embodiment can liquify due to the extreme high pressure which tends to force the contact areas 64 between the beads to become even greater. As can be seen in FIGS. 2 and 4, the beads when compressed will deform and can merge and even melt together from the extreme force applied.

Figure 5:
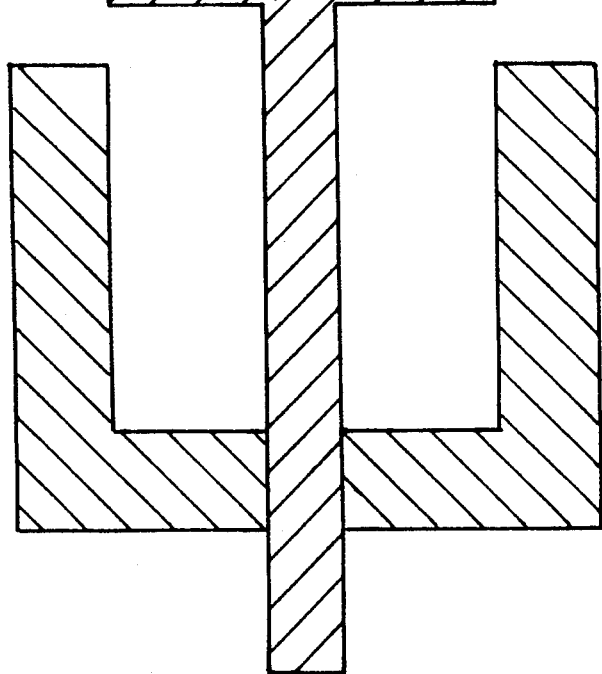
FIG. 5 illustrates the silicon powder, carbon powder and bead structure being lifted out of the mold.
Figure 6:
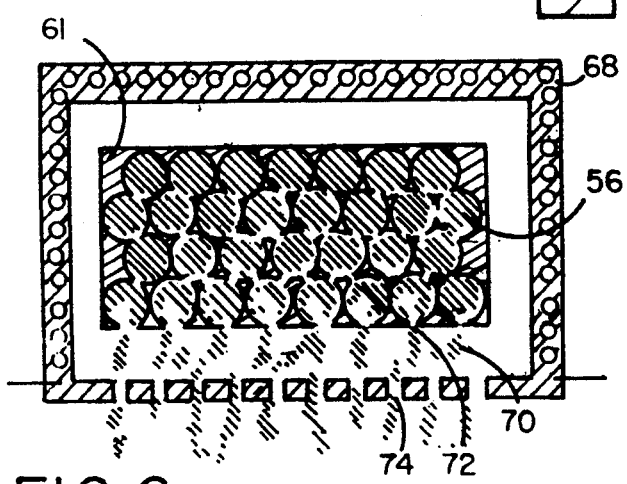
FIG. 6 illustrates the silicon powder, carbon powder and bead-like mass being baked in an oven to melt the bead-like members for their removal therefrom.
Figure 7:
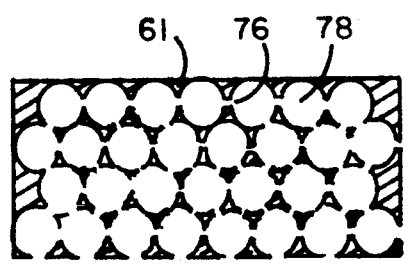
FIG. 7 illustrates a cross-section of the silicon carbide foam produced by the process of this invention.

FIG. 5 illustrates the structure, produced from either the mold arrangement of FIG. 1 or FIG. 3, being lifted out of the mold by member 60 when pressure plate 52 has been lifted out of the mold. This lifting raises structure 61 of beads/silicon powder/carbon powder out of the mold, and the structure retains its shape because of the great compression that was applied to it. Structure 61, as seen in FIG. 6, is then placed within furnace 68 which starts heating with sufficient temperature to liquify bead members 56 and to cause the bead member contents to pour through apertures formed in structure 61 so that the liquified bead contents, whether they be lead or other materials as discussed above, pour out through the apertures such as aperture 72 formed in the mass into the bottom of the oven and out oven apertures 74 to collecting areas not shown. The material of the beads, also through vaporization and outgassing, will eventually be vaporized or liquified to such an extent that they will leave the remaining cellular structure of the compressed silicon powder/carbon powder mixture which mass is continued to be heated to higher temperatures with open cells 78 formed therein as seen in FIG. 7 leaving a silicon carbide foam.

The foam structural members produced by the embodiments of the process of this invention can be utilized in many fields due to their light weight and high strength. In the aerospace field they can be utilized as structural members for space stations and the like. Such strong, lightweight material can even be used to form structural beams for flying craft such as dirigibles. The lightweight members produced by this invention can be used anywhere a high-strength, load-bearing structural member is required. Because of the foam-like structure of the solid material, other uses of the structure produced by the process of this invention are possible, and such material can be used as a foamed semi-conductor, ion trap, solar energy trap or filter. Some foamed structural material of this invention can be used to charge fluids for electrostatic deposition, and the extensive internal surface area of the structure can be used to contain catalysts for materials passed therethrough. The extensive internal surface area can also support beds for biological processing or can contain fissionable material where the foam is made of graphite or equivalent material. Foamed structural members can also be used as electrode plates in electrolysis or electrodeposition processes. In some cases certain waste products or even refuse can be utilized to produce the structural material in order to convert such waste products into a useful structural member. Materials that could be injected into the interstices between the beads include wood flour-filled polyesters, phenolics, epoxies and silicate-filled plastics and metals, and fiber-filled polymeric, inorganic, carbon or other types of plastics or metals.

Although the present invention has been described with reference to particular embodiments, it will be apparent to those skilled in the art that variations and modifications can be substituted therefor without departing from the principles and spirit of the invention.

I claim:

1. A process for producing a structural member comprising the steps of:

mixing a plurality of bead members of a diameter selected in the range of 1–10 mm in a silicon powder/carbon powder mixture;

placing said mixture in a mold;

compressing said mixture in said mold to form a compressed mass;

removing said compressed mass of silicon powder/carbon powder and bead members from said mold;

heating said compressed mass to melt said bead members in said compressed mass, the temperature of said heat sufficient for said bead members to leave said silicon powder/carbon powder mass thereby forming a plurality of cells having cell walls in said silicon powder/carbon powder mass in those areas where said bead members have been removed; and heating said silicon powder/carbon powder mass to a temperature sufficient to react the silicon powder and carbon powder with one another to form silicon carbide with a plurality of cells defined therein where said bead members had been located within said mass.

2. The process of claim 1 after said mixing step, further including the step of:

separating said bead members from one another within said silicon powder/carbon powder mixture.

3. The process of claim 1 before the step of compression further including the step of removing silicon powder/carbon powder from between said bead members to allow said bead members to contact one another within said mold.

4. The process of claim 3 wherein in the step of compressing said silicon powder/carbon powder/bead mass, the compression is of sufficient force to liquify said bead members.

* * * * *